(12) United States Patent
Chen et al.

(10) Patent No.: US 11,333,157 B2
(45) Date of Patent: May 17, 2022

(54) AUTOMATED FAN ADJUSTMENT SYSTEM

(71) Applicant: QUANTA COMPUTER INC., Taoyuan (TW)

(72) Inventors: Yi-Chieh Chen, Taoyuan (TW); Yueh-Chang Wu, Taoyuan (TW); Jen-Mao Chen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 123 days.

(21) Appl. No.: 16/706,428

(22) Filed: Dec. 6, 2019

(65) Prior Publication Data

US 2021/0172448 A1    Jun. 10, 2021

(51) Int. Cl.
*F04D 27/00* (2006.01)
*F04D 29/58* (2006.01)

(52) U.S. Cl.
CPC ......... *F04D 27/005* (2013.01); *F04D 27/001* (2013.01); *F04D 27/004* (2013.01); *F04D 29/5813* (2013.01)

(58) Field of Classification Search
CPC .... F04D 27/005; F04D 27/001; F04D 27/004; F04D 29/5813
See application file for complete search history.

(56) References Cited

U.S. PATENT DOCUMENTS

| | | | | |
|---|---|---|---|---|
| 8,374,716 | B1* | 2/2013 | Frankel | G05B 15/02 700/170 |
| 2002/0094280 | A1* | 7/2002 | Lin | F04D 19/007 417/286 |
| 2006/0142901 | A1* | 6/2006 | Frankel | H05K 7/20209 700/300 |
| 2012/0139369 | A1* | 6/2012 | Lendenmann | H02K 9/28 310/53 |
| 2016/0157380 | A1* | 6/2016 | Kull | H05K 7/20 211/26 |

FOREIGN PATENT DOCUMENTS

| | | |
|---|---|---|
| CN | 106321479 A | 1/2017 |
| TW | 471562 U | 1/2002 |

OTHER PUBLICATIONS

TW Office Action for Application No. 109106317, dated Jul. 20, 2020, w/ First Office Action Summary.
TW Search Report for Application No. 109106317, dated Jul. 20, 2020, w/ First Office Action.

* cited by examiner

*Primary Examiner* — Connor J Tremarche
(74) *Attorney, Agent, or Firm* — Nixon Peabody LLP

(57) ABSTRACT

A computing device has a fan housing that includes a dual rotor fan with a first rotor and a second rotor. The computing device also includes a controller communicatively coupled to the dual rotor fan. The controller is operable to detect a failure associated with the first rotor. In response to detecting the failure, the controller is operable to drive the second rotor at a higher speed than a fan-speed at which the second rotor was being driven before the failure.

20 Claims, 5 Drawing Sheets

AUTOMATED FAN ADJUSTMENT SYSTEM

FIELD OF THE INVENTION

The present disclosure relates generally to cooling systems for electronic devices, and more specifically, to an electronic component housing system incorporating a cooling system for improved fan performance in the event of fan failure.

BACKGROUND

Electronic devices, such as servers, include numerous electronic components that are powered to a common power supply. Servers generate an enormous amount of heat due to the operation of internal electronic devices such as controllers, processors, and memory. Overheating from the inefficient removal of such heat has the potential to shut down or impede the operation of such devices. Thus, servers are designed to rely on air flow through the interior of the device to carry away heat generated from electronic components. Servers often include various heat sinks that are attached to the electronic components, such as processing units. Heat sinks are typically composed of thermally conductive material.

Heat sinks absorb the heat from the electronic components, thus transferring the heat away from the components. The heat from heat sinks must be vented away from the server. Air flow to vent away such heat is often generated by a fan system. The generated air flow, thus, carries collected heat away from the components and the heat sink. A good thermal design assures that the smallest fan power with limited air flow is sufficient to cool a fixed server or switch system power level. Thus, air flow can pass through hot electric components in the device without any reverse air flow because the internal layout effectively channels the air flow.

A typical fan system includes multiple fans that may be grouped together in a fan wall to provide maximum cooling. Further, additional fans provide redundancy that allows for the operation of the server even if one of the fans in the fan wall fails.

Thus, there is a great need for providing a device and method that solves the above and other problems, including, for example, compensating for a failed fan in a computing device with a dual rotor fan.

SUMMARY

According to one embodiment of the present disclosure, a computing device has a fan housing, which includes a dual rotor fan. The dual rotor fan has a first rotor and a second rotor. The computing device also includes a controller communicatively coupled to the dual rotor fan. The controller is operable to detect a failure associated with the first rotor and, in response to detecting the failure, to drive the second rotor at a higher speed than a fan-speed at which the second rotor was being driven before the failure.

According to some implementations of this embodiment, the computing device also includes a second dual rotor fan communicatively coupled to the controller. The controller is operable to detect a failure associated with a first rotor of the second dual rotor fan, and, in response to detecting the failure of the first rotor of the second dual rotor fan, drive a second rotor of the second dual rotor fan at a higher speed than a fan-speed at which the second rotor of the second dual rotor fan was being driven before the failure.

According to yet other implementations of this embodiment, the computing device can also include a motherboard configured to house the controller. The motherboard is configured to receive convection cooling from the dual rotor fan of the fan housing.

According to yet other implementations of this embodiment, the computing device includes at least one electronic component configured to receive convection cooling from the dual rotor fan of the fan housing.

According to yet other implementations of this embodiment, the controller is further operable to detect the failure associated with the first rotor by determining that either the first rotor or the second rotor is performing at a fan-speed below a predefined threshold. In some other implementations, the predefined threshold is five-hundred (500) revolutions per minute (RPM).

According to yet other implementations of this embodiment, the controller is located within the fan housing of the dual rotor fan. According to yet other implementations of the present disclosure, the controller is an external device positioned outside the fan housing. According to yet other implementations of the present disclosure, the higher speed is greater than a 100% duty speed associated with the second rotor.

According to another embodiment of the present disclosure, a dual rotor fan includes a housing, a first rotor positioned within the housing, and a second rotor positioned adjacent to the first rotor within the housing. The dual rotor fan also includes a controller communicatively coupled to the dual rotor fan. The controller is operable to detect a failure associated with the first rotor and, in response to detecting the failure, drive the second rotor at a higher speed than a fan-speed at which the second rotor was being driven before the failure.

According to some implementations of this embodiment, the controller is operable to detect the failure associated with the first rotor by determining that at least one of the first rotor or the second rotor is performing at a fan-speed below a predefined threshold. In some implementations, the predefined threshold is one-thousand (1000) revolutions per minute (RPM). In some other implementations, the predefined threshold is five-hundred (500) revolutions per minute (RPM).

According to yet other implementations of this embodiment, the higher speed is greater than a 100% duty speed associated with the second rotor. According to yet other implementations of this embodiment, the controller is located within the housing of the dual rotor fan.

According to yet another embodiment of the present disclosure, a cooling system includes a dual rotor fan that includes a housing, a first rotor positioned within the housing, and a second rotor positioned adjacent to the first rotor within the housing. The cooling system also includes a controller communicatively coupled to the dual rotor fan. The controller is operable to detect a failure associated with the first rotor and, in response to detecting the failure, drive the second rotor at a higher speed than a fan-speed at which the second rotor was being driven before the failure.

According to some implementations of this embodiment, the controller is located within the housing of the dual rotor fan. According to yet other implementations of this embodiment, the controller is an external device positioned outside the housing.

According to yet other implementations of this embodiment, the controller includes a remote controller that is communicatively coupled to the dual rotor fan over a communication network. According to yet other implementations of this embodiment, the higher speed is greater than a 100% duty speed associated with the second rotor.

Additional features and advantages of the disclosure will be set forth in the description that follows, and in part, will be obvious from the description; or can be learned by practice of the principles disclosed herein. The features and advantages of the disclosure can be realized and obtained by means of the instruments and combinations particularly pointed out in the appended claims. These and other features of the disclosure will become fully apparent from the following description and appended claims, or can be learned by the practice of the principles set forth herein.

BRIEF DESCRIPTION OF THE DRAWINGS

In order to describe the manner in which the above-recited disclosure and its advantages and features can be obtained, a more particular description of the principles described above will be rendered by reference to specific examples illustrated in the appended drawings. These drawings depict only example aspects of the disclosure, and are therefore not to be considered as limiting of its scope. These principles are described and explained with additional specificity and detail through the use of the following drawings.

DETAILED DESCRIPTION

Figure 1:
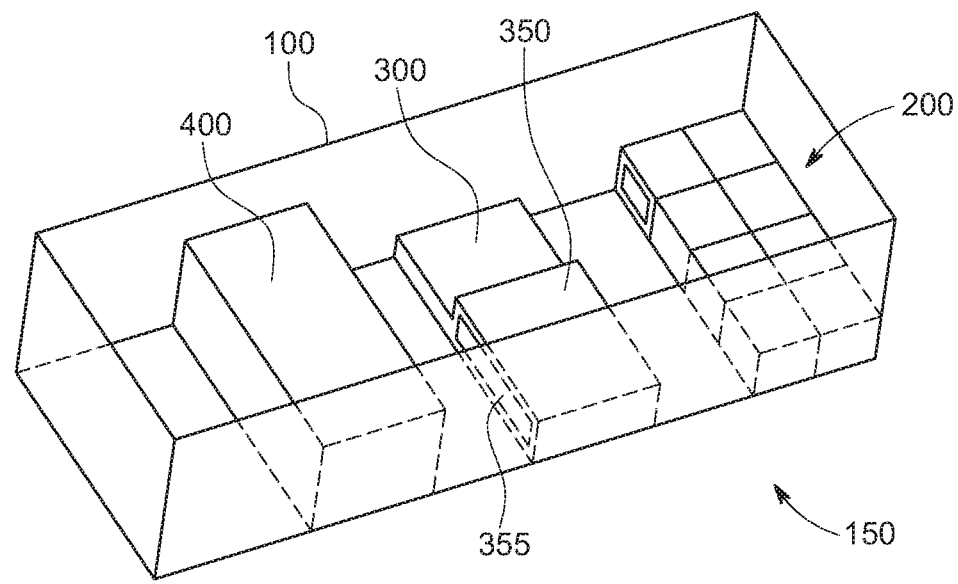
FIG. 1 is an axonometric view of a computing device, such as a server, according to certain aspects of the present disclosure.

The present invention is described with reference to the attached figures, where like reference numerals are used throughout the figures to designate similar or equivalent elements. The figures are not drawn to scale, and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Figure 2:
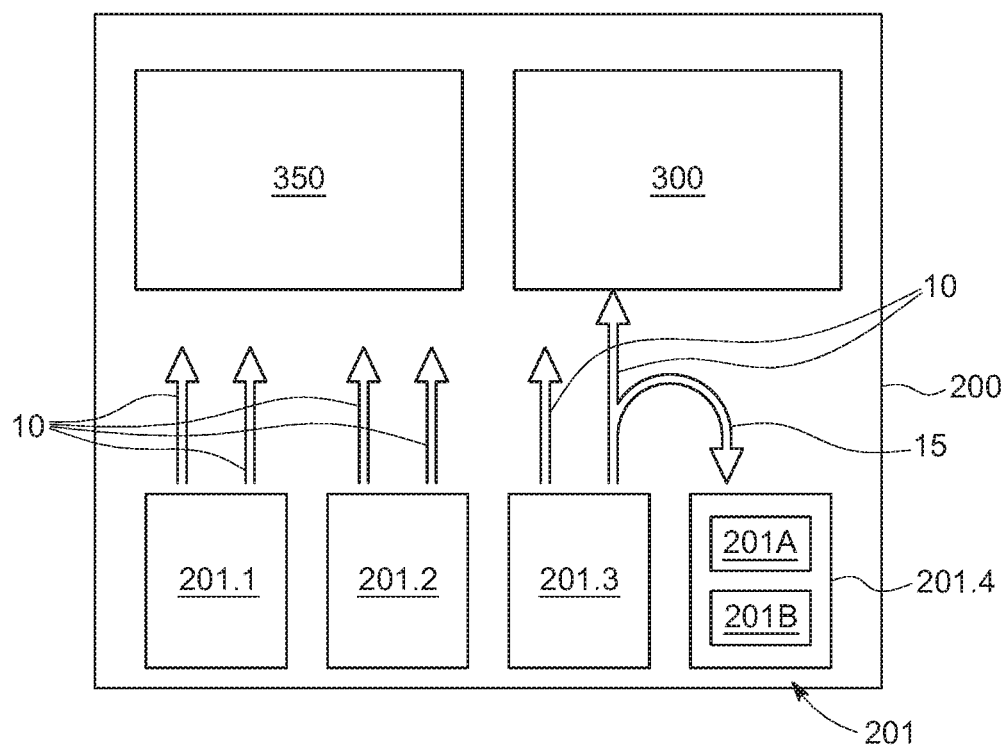
FIG. 2 is a top view of the computing device of FIG. 1, including a fan housing and at least one dual rotor fan, according to certain aspects of the present disclosure.

Referring initially and generally to FIGS. 1 and 2, a fan housing 200 is illustrated and described in accordance with certain aspects of the present disclosure. As illustrated in FIG. 1, the fan housing 200 is included in a computing device 150, such as a server device. FIG. 1 is an axonometric view of the exemplary computing device 150, and FIG. 2 is a top view showing the fan housing 200 of the computing device 150.

Referring specifically to FIG. 1, the computing device 150 includes a chassis 100, which includes the fan housing 200. The chassis 100 also includes a power supply unit 300, a motherboard 350, and peripheral devices 400.

Referring specifically to FIG. 2, the fan housing 200 has multiple dual rotor fans 201.*n*, according to certain aspects of the present disclosure. The fan housing 200 also includes at least one dual rotor fan 201. In some cases, the at least one dual rotor fan 201 includes a first rotor 201A and a second rotor 201B. The first rotor 201A and the second rotor 201B are communicatively coupled to a server located on-board, or to a controller. The disclosed implementations herein do not attempt to limit the first rotor 201A and the second rotor 201B based on the illustrated positions in FIG. 2.

For the purposes of this disclosure, only a dual rotor fan is illustrated. However, a fan embodying any multiple number of rotors can be implemented herein. The power supply unit 300 is configured to receive convection cooling from the dual rotor fan 201 of the fan housing 200. The dual rotor fan is configured to receive power from the power supply unit 300. Similarly, the motherboard 350 is configured to receive convection cooling from the dual rotor fan 201 of the fan housing 200. In some implementations, the motherboard 350 is configured to house a controller 355 (which is illustrated in FIG. 1). The first rotor 201A and second rotor 201B of the dual rotor fan are coupled to a server located on-board the dual rotor fan, and/or the controller 355 of the motherboard 350. The controller 355 is operable to detect a failure associated with either the first rotor 201A or the second rotor 201B. In response to detecting the failure, the controller 355 then drives the other of the first rotor 201A and the second rotor 201B at a higher speed than a fan-speed at which the first rotor 201A or the second rotor 201B was being driven before the failure.

For illustrative purposes, failure of either the first rotor 201A or second rotor 201B and subsequent driving of the other of the first rotor 201A and the second rotor 201B at a higher speed will be described with reference only to failure of a first rotor 201A and subsequent driving of a second rotor 201B at a higher speed. However, wherever a failure of a first rotor 201A is detected and subsequent driving of a second rotor 201B at a higher speed is disclosed, one may substitute other rotors, such as failure of a second rotor 201B being detected and subsequent driving of a first rotor 201A at a higher speed.

The peripheral devices 400 (which are illustrated in FIG. 1) are also configured to receive convection cooling from the dual rotor fan 201 of the fan housing 200. The controller 355 (which is illustrated in FIG. 1) is operable to detect the failure of either rotor by determining that the rotor is performing at a fan-speed below a predefined threshold. In some implementations, the predefined threshold is one-thousand (1000) revolutions per minute (RPM). In other implementations, the predefined threshold is five-hundred (500) revolutions per minute (RPM). While the controller 355 is illustrated within the motherboard 350 herein, the rotors of the dual rotor fan interact with other controllers with various benefits. While various components are illustrated herein, any number or arrangement of internal components of the server device can be implemented herein.

Figure 3:
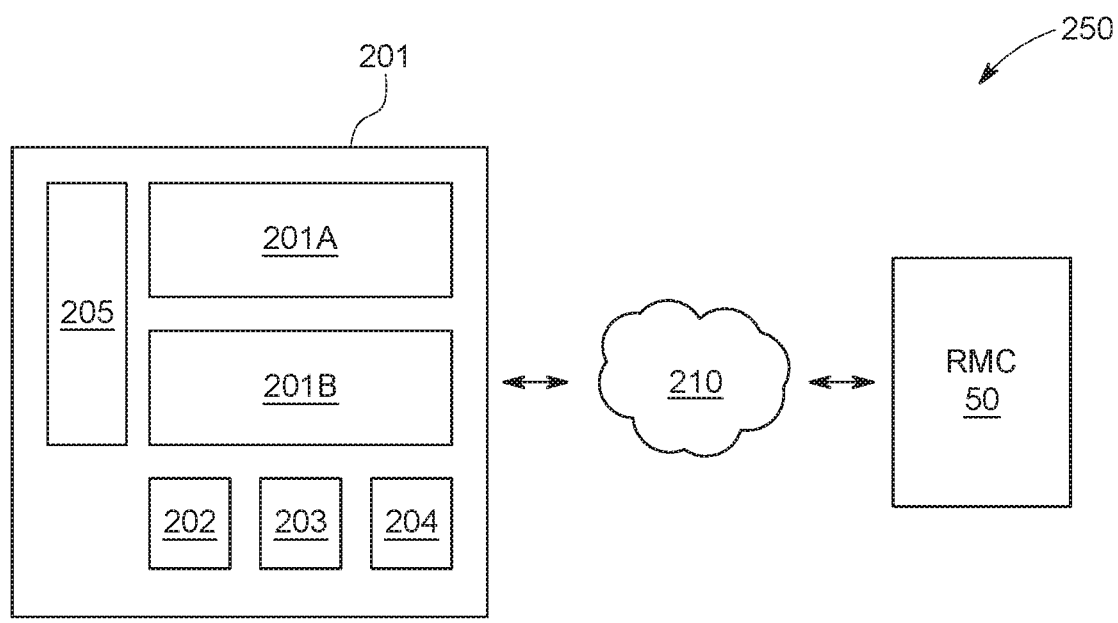
FIG. 3 is a schematic diagram of a network system including the dual rotor fan of FIG. 2, according to certain aspects of the present disclosure.

For the purposes of this illustration, the multiple dual rotor fans 201.*n* include dual rotor fans 201.1, 201.2, and 201.3 that operate at or above the predefined threshold. In this way, each dual rotor fan produces airflow 10. A dual rotor fan 201.4 is encountering a fan failure, in that only one rotor of at least two rotors is operating at or above the predefined threshold. For the purposes of this illustration, the first rotor 201A has failed, and the second rotor 201B is still operating at or above the predefined threshold. Upon failure of the first rotor 201A, the dual rotor fan 201.4 performs at a lesser efficiency than the adjacent dual rotor fans 201.1 and 201.2. The failure of the first rotor 201A causes a loss of pressure within the dual rotor fan 201.4 itself. Directly adjacent to the dual rotor fan 201.3, the dual rotor fan 201.3 produces airflow 15, which is being cycled through the dual rotor fan 201.4 due to the loss of pressure. As a result, the failure of the first rotor 201A causes the dual rotor fan 201.3 to also perform at a lesser efficiency than the adjacent dual rotor fans 201.1 and 201.2. As illustrated above, the controller 355 (which is illustrated in FIG. 1) directs an actuator 204 (which is illustrated in FIG. 3 below) to drive the second rotor 201B at a higher speed, in response to detecting the failure of the first rotor 201A. Operating the second rotor 201B at the higher speed is intended to compensate for the loss of airflow resulting from the failed first rotor 201A. Furthermore, operating the second rotor 201B at the higher speed is intended to increase the pressure within the dual rotor fan 201.4.

FIG. 3 is a schematic diagram of a network system 250. The network system 250 includes the dual rotor fan 201 of FIG. 2. The dual rotor fan 201 includes the first rotor 201A, the second rotor 201B, a receiver 202, a transmitter 203, and the actuator 204. In some implementations, the dual rotor fan 201 can also include a controller 205. The controller 205 is operable to detect a failure associated with the first rotor 201A. The controller 205 is also configured to direct the actuator 204 to drive the second rotor 201B at a higher speed, in response to detecting the failure of the first rotor 201A.

Alternatively, the dual rotor fan 201 is coupled to a remote management controller 50 via a network communication connection 210 (e.g., a wired or wireless connection). Specifically, the remote management controller 50 is communicatively coupled to the receiver 202 and the transmitter 203. In some implementations, the functionality of the receiver 202 and the transmitter 203 can be combined into a single transceiver, which is communicatively coupled to the remote management controller 50. The remote management controller 50 receives fan data via the network communication connection 210 from the actuator 204 with respect to the first rotor 201A and the second rotor 201B. Based on the fan data received from the actuator, the remote management controller 50 is operable to detect a failure associated with the first rotor 201A based on the fan data. The remote management controller 50 is also configured to direct the actuator 204 to drive the second rotor 201B at a higher speed, in response to detecting the failure of the first rotor 201A. The higher speed is determined by the remote management controller 50 to be the most effective speed to increase the pressure within the dual rotor fan 201.

Figure 4:
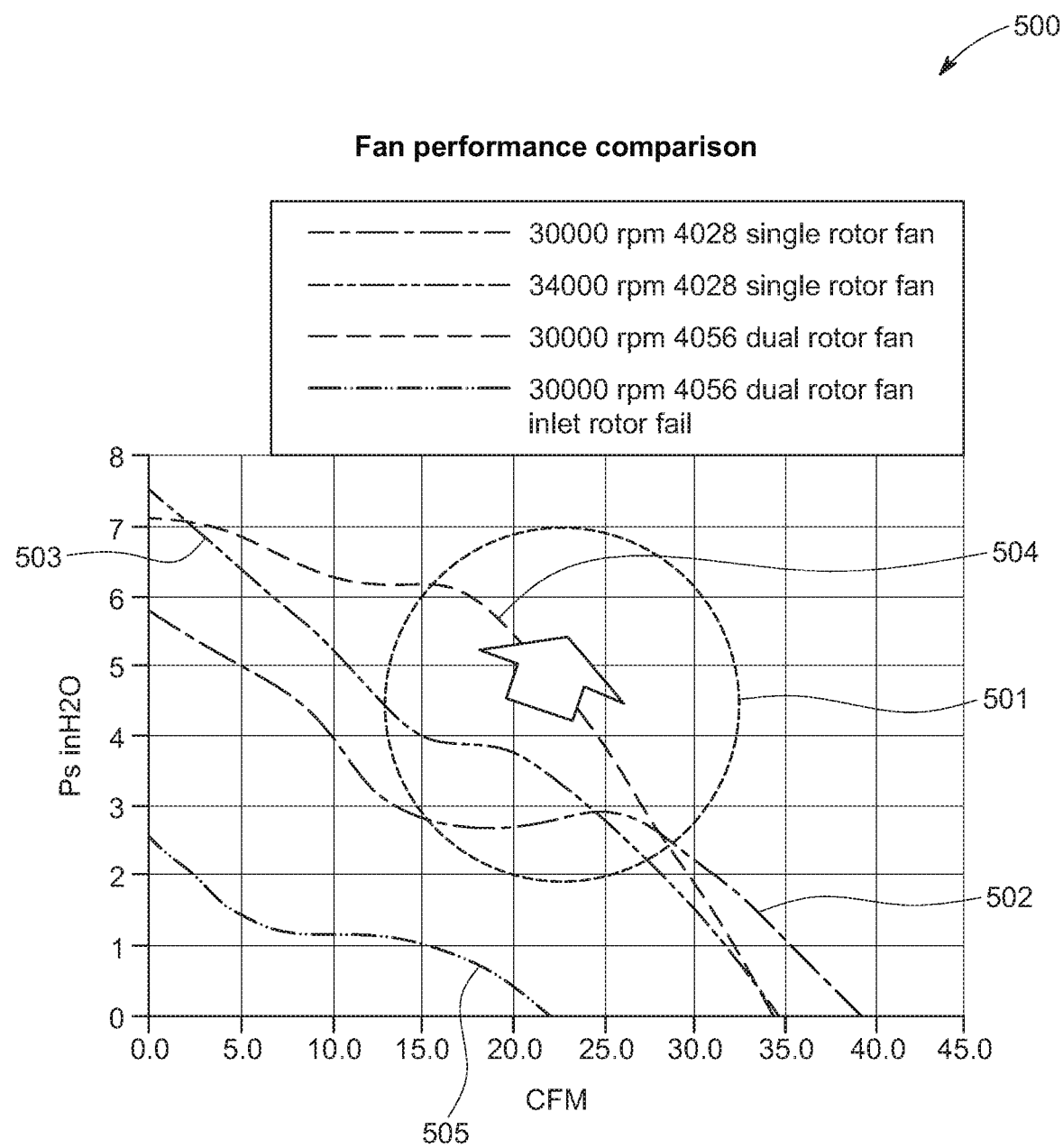
FIG. 4 is a chart indicating performance of the dual rotor fan, according to certain aspects of the present disclosure.

FIG. 4 is a chart 500 indicating performance of the dual rotor fan of FIG. 3, according to certain aspects of the present disclosure. The chart 500 illustrates performance of rotor(s) fans with respect to internal pressure of the fan housing and velocity passing through the fan housing. The velocity is measured in cubic feet per minute (CFM). The pressure is measured in pounds per square inch of water (PSI in $H_2O$). The chart 500 illustrates performance 502 of a single rotor fan operating at thirty-thousand (30,000) revolutions per minute (RPM). The chart 500 also illustrates performance 503 of a single rotor fan operating at thirty-four-thousand (34,000) RPM. The chart 500 also illustrates performance 504 of a dual rotor fan operating at thirty-thousand (30,000) RPM. Finally, the chart 500 also illustrates performance 505 of a dual rotor fan experiencing rotor failure and operating at thirty-thousand (30,000) RPM. The chart 500 also illustrates a system operating area 501. As illustrated herein, the performance 505 of the dual rotor fan experiencing rotor failure and operating at thirty-thousand (30,000) RPM does not operate within the system operating area 501.

Figure 5:
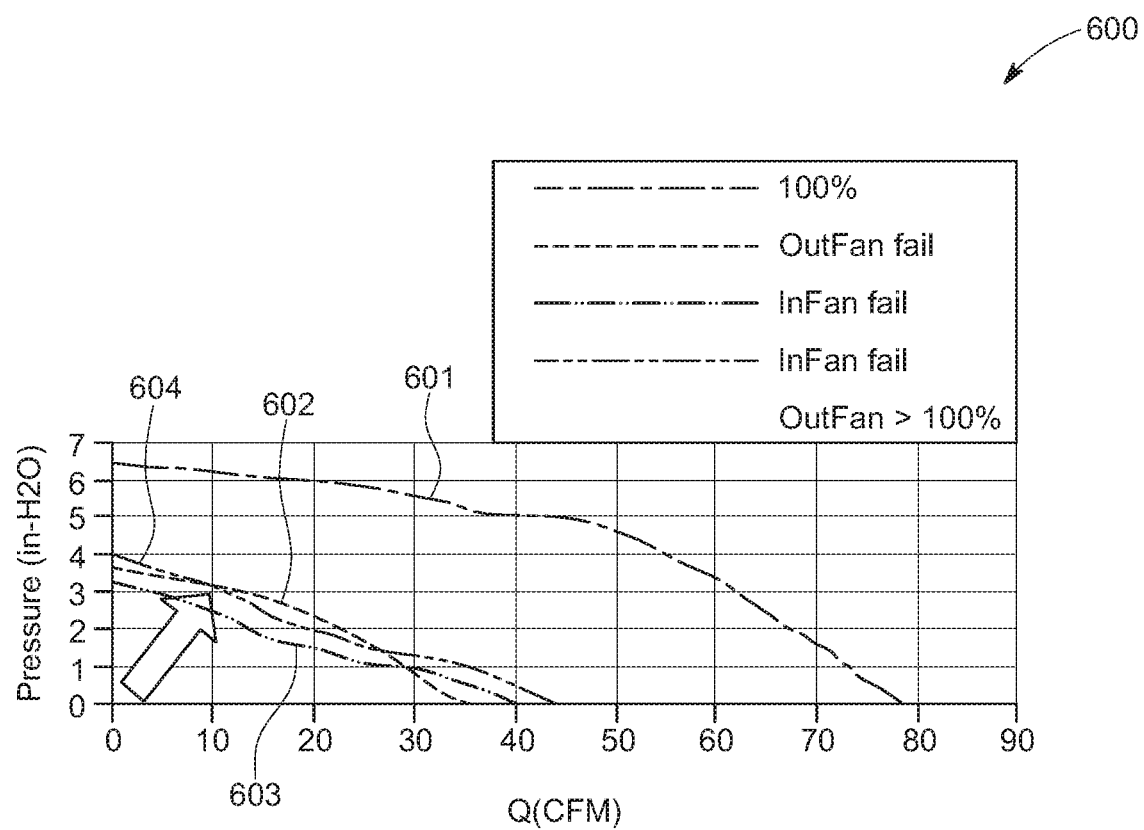
FIG. 5 is a chart indicating performance of each rotor in the dual rotor fan, according to certain aspects of the present disclosure.

FIG. 5 is a chart 600 indicating performance of each rotor within the dual rotor fan, according to certain aspects of the present disclosure. The chart 600 illustrates performance of a single dual rotor fan with respect to internal pressure of the fan housing and velocity passing through the fan housing. Similar to chart 500, the velocity is measured in cubic feet per minute (CFM), and the pressure is measured in pounds per square inch of water (PSI in $H_2O$). The chart 600 illustrates performance 601 of the dual rotor fan operating at 100% (i.e., both the first rotor and the second rotor are fully operational. The chart 600 also illustrates performance 602 of the dual rotor fan where the outer-rotor fan has failed. For the purposes of illustration, the outer-rotor fan is the first rotor 201A of FIG. 1. The chart 600 also illustrates performance 603 of the dual rotor fan where the inner-rotor fan has failed. For the purposes of illustration, the inner-rotor fan is the second rotor 201B of FIG. 1. As indicated above, once the failure of the inner-rotor fan is detected, the outer-rotor fan is driven at a higher speed, or above 100%. The chart 600 also illustrates performance 604 of the dual rotor fan where the inner-rotor fan has failed and the outer-rotor fan is driven at a higher speed, or above 100%. As indicated herein, the performance 602 of the dual rotor fan (where the outer-rotor fan has failed) exceeds the performance 603 of the dual rotor fan (where the inner-rotor fan has failed). Similarly, the performance 604 of the dual rotor fan (where (a) the inner-rotor fan has failed and (b) the outer-rotor fan is driven at a higher speed) also exceeds the performance 603 of the dual rotor fan (where the inner-rotor fan has failed).

Figure 6:
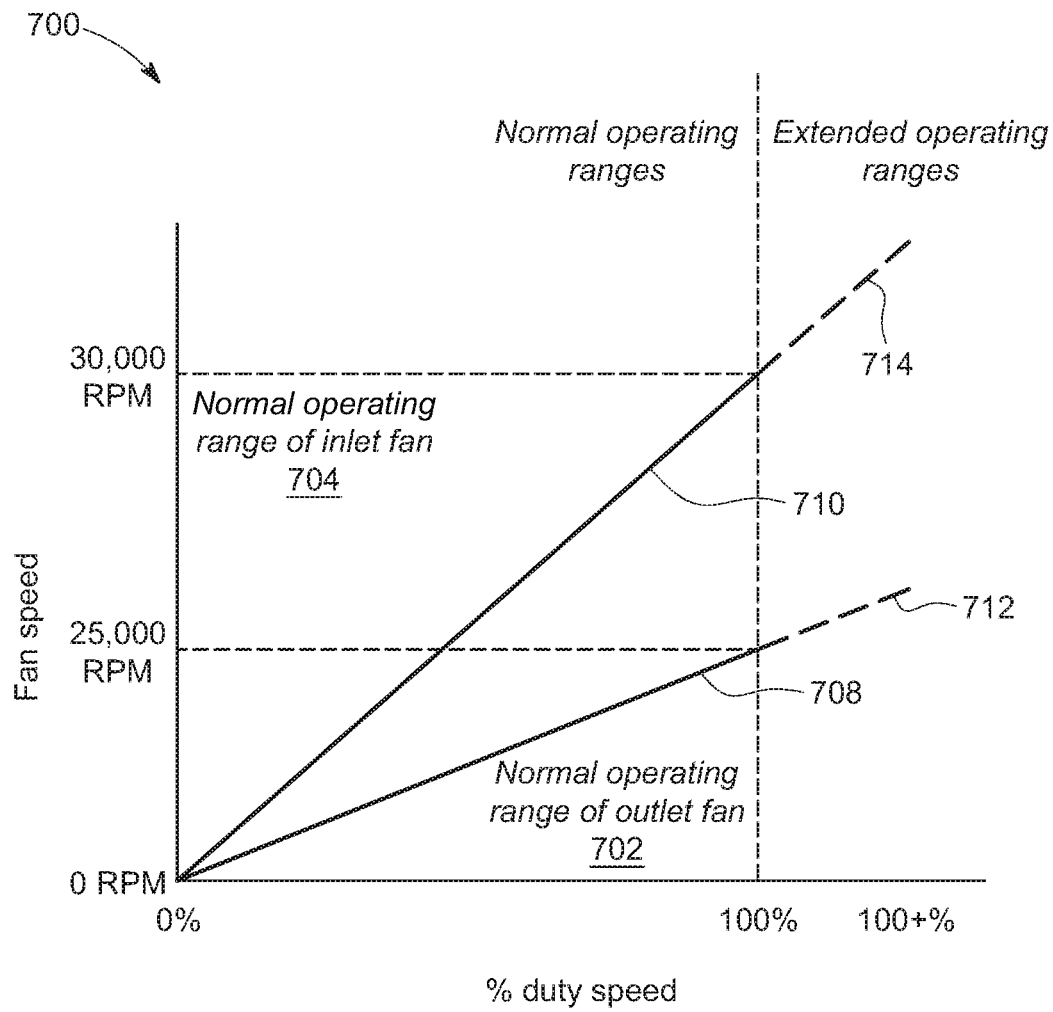
FIG. 6 is a chart depicting normal operating range and extended operating range of rotors of a dual rotor fan, according to certain aspects of the present disclosure.

FIG. 6 is a chart 700 depicting normal and extended operating ranges and of rotors of a dual rotor fan, according to certain aspects of the present disclosure. The chart illustrates a normal operating range 702 of an outlet fan that, according to this example, has a fan speed of up to twenty-five-thousand (25,000) RPM. The chart further illustrates a normal operating range 704 of an inlet fan that, according to this example, has a fan speed of up to thirty-thousand (30,000) RPM. Both normal operating ranges 702, 704 are within a duty speed range of 0%-100%, and vary in accordance with respective normal speeds 708, 710. Specifically, the relationship between the fan speed (RPM) and the duty speed (%) of each fan increases linearly as shown via respective lines representing the normal speed 708, 710.

When the inlet and outlet fans are operated beyond their normal duty speed of 100%, the respective fan speed continues to increase linearly beyond the respective maximum normal speed, as illustrated by the respective extended speeds 712, 714. In other words, after reaching 100% duty speed, the maximum speed of twenty-five-thousand (25,000) RPM of the outlet fan continues to increase from the normal speed 708, thereby transitioning and extending in the 100+% duty speed to an extended speed 712 that continues to increase linearly as the duty speed increases. Similarly, after reaching 100% duty speed, the maximum speed of thirty-thousand (30,000) RPM of the inlet fan continues to increase from the normal speed 710, thereby transitioning and extending in the 100+% duty speed to an extended speed 714 that continues to increase linearly as the duty speed increases.

Thus, the fan speed does not stop or remain constant when the normal maximum speed is reached. Instead, as illustrated and discussed above, the fan speed continues to increase in the extended operating range of each fan of the inlet and outlet fans. This beneficial aspect is advantageous over previous fans, cooling systems, and/or computing devices.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A computing device, comprising:
   a fan housing including a dual rotor fan having a first rotor and a second rotor, wherein the dual rotor fan is configured to operate at a fan speed that continues to increase linearly in direct proportion to a duty speed in an extended operating range beyond a maximum normal speed; and
   a controller communicatively coupled to the dual rotor fan, the controller being operable to:
   detect a failure associated with the first rotor; and
   in response to detecting the failure, drive the second rotor at a higher speed than a fan-speed at which the second rotor was being driven before the failure.

2. The computing device of claim 1, further comprising a second dual rotor fan communicatively coupled to the controller, the controller being further operable to:
   detect a failure associated with a first rotor of the second dual rotor fan; and
   in response to detecting the failure of the first rotor of the second dual rotor fan, drive a second rotor of the second dual rotor fan at a higher speed than a fan-speed at which the second rotor of the second dual rotor fan was being driven before the failure.

3. The computing device of claim 1, further comprising a motherboard configured to house the controller, the motherboard being configured to receive convection cooling from the dual rotor fan.

4. The computing device of claim 1, further comprising at least one electronic component configured to receive convection cooling from the dual rotor fan.

5. The computing device of claim 1, wherein the controller is further operable to detect the failure associated with the first rotor by determining that at least one of the first rotor or the second rotor is performing at a fan-speed below a predefined threshold.

6. The computing device of claim 5, wherein the predefined threshold is five-hundred (500) revolutions per minute (RPM).

7. The computing device of claim 1, wherein the controller is located within the fan housing.

8. The computing device of claim 1, wherein the controller is an external device positioned outside the fan housing.

9. The computing device of claim 1, wherein the higher speed is greater than a 100% duty speed associated with the second rotor.

10. A dual rotor fan comprising:
    a housing;
    a first rotor positioned within the housing;
    a second rotor positioned adjacent to the first rotor within the housing, wherein the dual rotor fan is configured to operate at a fan speed that continues to increase linearly in direct proportion to a duty speed in an extended operating range beyond a maximum normal speed; and
    a controller communicatively coupled to the dual rotor fan, the controller being operable to:
    detect a failure associated with the first rotor; and
    in response to detecting the failure, drive the second rotor at a higher speed than a fan-speed at which the second rotor was being driven before the failure.

11. The dual rotor fan of claim 10, wherein the controller is further operable to detect the failure associated with the first rotor by determining that at least one of the first rotor or the second rotor is performing at a fan-speed below a predefined threshold.

12. The dual rotor fan of claim 11, wherein the predefined threshold is one-thousand (1000) revolutions per minute (RPM).

13. The dual rotor fan of claim 11, wherein the predefined threshold is five-hundred (500) revolutions per minute (RPM).

14. The dual rotor fan of claim 10, wherein the higher speed is greater than a 100% duty speed associated with the second rotor.

15. The dual rotor fan of claim 10, wherein the controller is located within the housing of the dual rotor fan.

16. A cooling system, comprising:
    a dual rotor fan including
    a housing;
    a first rotor positioned within the housing; and
    a second rotor positioned adjacent to the first rotor within the housing, wherein the dual rotor fan is configured to operate at a fan speed that continues to increase linearly in direct proportion to a duty speed in an extended operating range beyond a maximum normal speed; and a controller communicatively coupled to the dual rotor fan, the controller being operable to:
  detect a failure associated with the first rotor; and
  in response to detecting the failure, drive the second rotor at a higher speed than a fan-speed at which the second rotor was being driven before the failure.

17. The cooling system of claim 16, wherein the controller is located within the housing of the dual rotor fan.

18. The cooling system of claim 16, wherein the controller is an external device positioned outside the housing.

19. The cooling system of claim 16, wherein the controller includes a remote controller that is communicatively coupled to the dual rotor fan over a communication network.

20. The cooling system of claim 16, wherein the higher speed is greater than a 100% duty speed associated with the second rotor.

* * * * *